(12) United States Patent  
Tanaka et al.

(10) Patent No.: US 7,268,664 B2  
(45) Date of Patent: Sep. 11, 2007

(54) REMOTE CONTROL SYSTEM, ON-VEHICLE EQUIPMENT AND REMOTE CONTROL METHOD

(75) Inventors: Katsuaki Tanaka, Hitachi (JP); Shigeru Matsuo, Hitachinaka (JP); Kimiyoshi Machii, Hitachi (JP); Michio Morioka, Hitachi (JP); Yoshinori Endo, Mito (JP)

(73) Assignees: Hitachi, Ltd., Tokyo (JP); HCX Corporation, Toda-shi (JP)

( * ) Notice: Subject to any disclaimer, the term of this patent is extended or adjusted under 35 U.S.C. 154(b) by 3 days.

(21) Appl. No.: 10/226,115

(22) Filed: Aug. 23, 2002

(65) Prior Publication Data

US 2003/0043019 A1   Mar. 6, 2003

(30) Foreign Application Priority Data

Sep. 3, 2001 (JP) .............................. 2001-266301

(51) Int. Cl.  
*G05B 19/00* (2006.01)

(52) U.S. Cl. ................... 340/5.64; 340/5.61; 340/5.62; 340/5.63; 340/5.33; 340/5.5; 340/825.69; 340/825.72; 340/7.72; 340/7.39

(58) Field of Classification Search ............... 340/5.64, 340/5.72, 5.61, 426.13, 426.14, 426.15, 426.16, 340/426.17, 7.39, 7.2, 7.1, 825.69, 825.72; 701/202; 455/420  
See application file for complete search history.

(56) References Cited

U.S. PATENT DOCUMENTS

| | | | | |
|---|---|---|---|---|
| 5,557,254 A | * | 9/1996 | Johnson et al. | ........ 340/426.19 |
| 6,028,537 A | * | 2/2000 | Suman et al. | ................ 340/988 |
| 6,480,098 B2 | * | 11/2002 | Flick | ........................... 340/7.2 |
| 6,484,093 B1 | * | 11/2002 | Ito et al. | ..................... 701/211 |
| 6,760,759 B1 | * | 7/2004 | Chan | .......................... 709/219 |
| 2002/0116117 A1 | * | 8/2002 | Martens et al. | ............. 701/115 |

FOREIGN PATENT DOCUMENTS

| | | |
|---|---|---|
| JP | 2000-215211 | 8/2000 |
| JP | 2001-148092 | 5/2001 |
| JP | 2002-221425 | 8/2002 |

* cited by examiner

*Primary Examiner*—Brian Zimmerman  
*Assistant Examiner*—Vernal Brown  
(74) *Attorney, Agent, or Firm*—Crowell & Moring LLP

(57) ABSTRACT

In a remote control apparatus, for achieving remote control of an on-vehicle equipment, in accordance with a request received from a terminal other than the on-vehicle equipment, wherein a request receiver portion 101 receives control content from a stationary-type terminal 30₁ or a portable-type terminal 30₂, thereby registering it into a control information DB 105, while corresponding it to ID information of a user thereof. Upon receipt of the ID information from the on-vehicle equipment 20, a control information transmitter portion 102 transmits the control information depending upon the control content, being registered in the control information DB 105 corresponding thereto, to the on-vehicle equipment 20. With this, the on-vehicle equipment 20 is controlled in accordance with the control content, which was received from the user in advance, remotely.

6 Claims, 10 Drawing Sheets

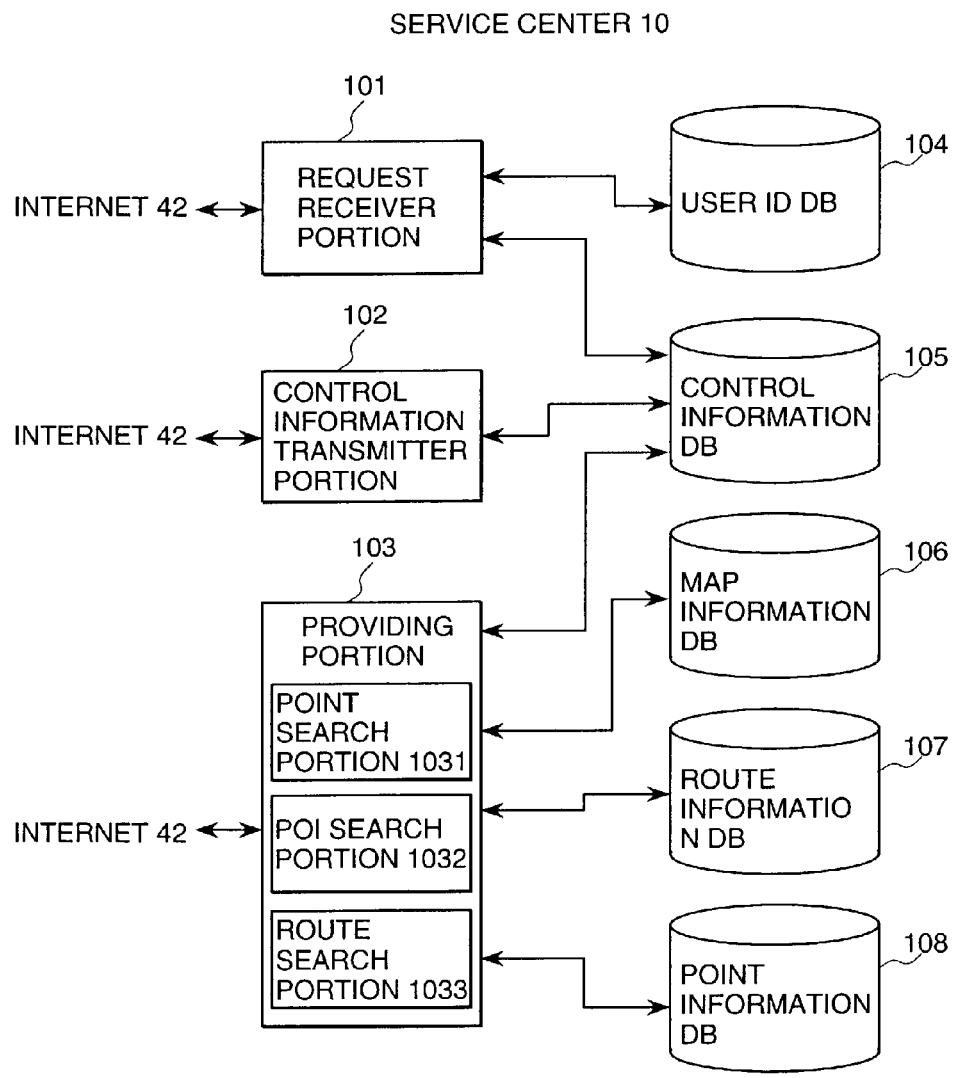

FIG. 3
CONTROL INFORMATION DB 105

| ID INFORMATION | CONTROL CONTENTS | CONTROL COMMAND | PARAMETER(S) | EXECUTION RESULT | FLAG |
|---|---|---|---|---|---|
| * * * * * | POINT DISPLAY(**PARK) | DIS_POS | POINT(x,y) | * * * | VALID |
| * * * * * | ROUTE GUIDANCE(**HOTEL) | GUI_ROU | OBJECT(x,y) | * * * | INVALID |
| * * * * * | POI DISPLAY(HOTEL, VICINITY OF CAR ITSELF) | DIS_POI | GENRES:, AREA: | * * * | INVALID |
| * * * * * | POI DISPLAY(PARK,*AREA) | DIS_POI | GENRES:, AREA: VICINITY OF CAR ITSELF | NO | INVALID |
| * * * * * | POINT DISPLAY(VICINITY OF CAR ITSELF) | DIS_POS | POINT:CAR | NO | INVALID |
| * * * * * | ROUTE GUIDANCE(**STATION) | GUI_ROU | OBJECT(x,y) | | VALID |
| | ------- | ------- | ------- | ------- | ------- |

DESCRIPTION METHOD OF CONTROL INFORMATION:
DESCRIBE TAG-METHOD

<COMMAND>CONTROL COMMAND</COMMAND>
<PARAMETER>PARAMETER</COMMAND>

FIG. 6    ON-VEHICLE APPARATUS 20
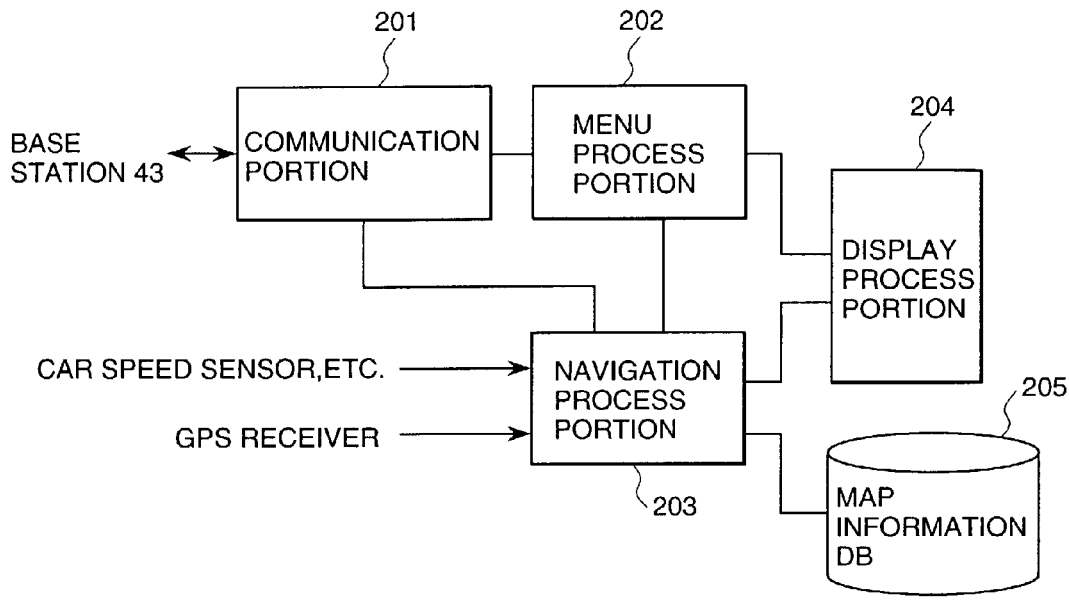
FIG. 7
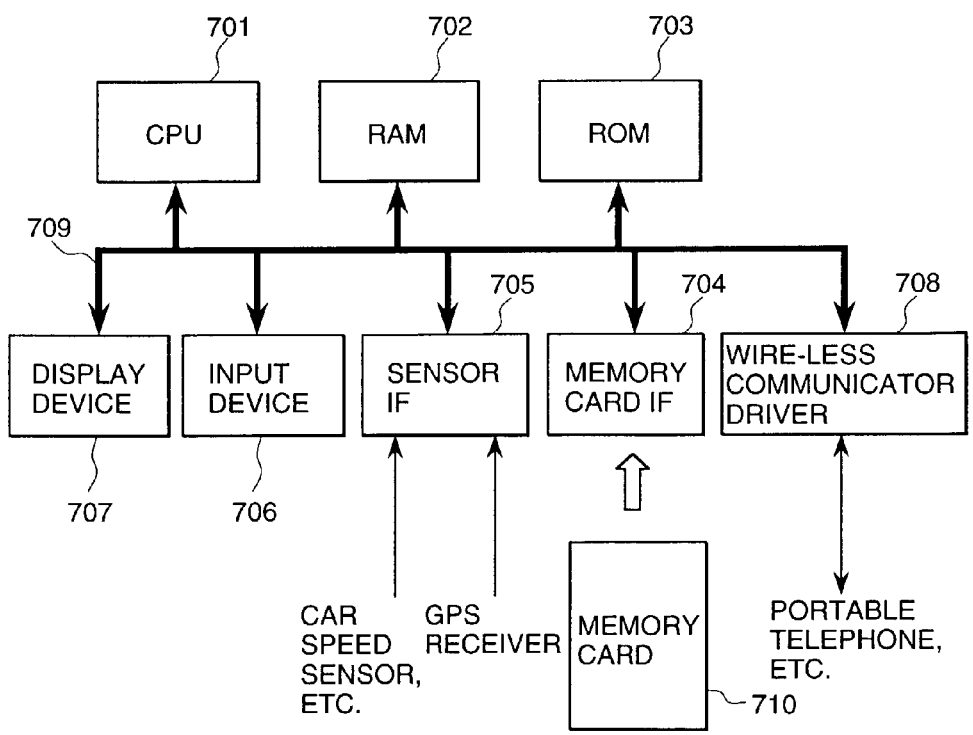

REMOTE CONTROL SYSTEM, ON-VEHICLE EQUIPMENT AND REMOTE CONTROL METHOD

BACKGROUND OF THE INVENTION

The present invention relates to a technology for achieve remote control on an on-vehicle apparatus or equipment, such as a navigation apparatus, etc., for example, and in particular relates to a technology for allowing or causing the on-vehicle equipment to execute control content which is received from a communication terminal other than such the on-vehicle equipment.

Accompanying with wide spreading of use of a navigation apparatus, achieving a communication function with using a portable telephone apparatus, etc., for example, a service system is proposed, for providing various services therewith, through the remote control of such the navigation apparatus, by means of a remote control apparatus. Such the service system of this kind as was mentioned above is already known, such as a service system of the compass rink Co., (Compass Rink), for example.

With such the system as was mentioned above, a user connects a portable telephone apparatus to the navigation apparatus with using an adaptor for exclusive use thereof, and she/he also makes a telephone call to an information center by using this portable telephone apparatus, thereby informing the content(s) of the service she/he wishes to an operator responding thereto.

At the information center, the telephone apparatus and the computers are integrated or unified by means of a technology of CTI (Computer Telephony Integration). The operator responding to the telephone call from the user with using the telephone apparatus determines the control content(s) to be executed by the navigation apparatus, for the purpose of providing the service content(s) required from the user. And, with using the computer, the control information is sent to the navigation apparatus, thereby causing or bringing the navigation apparatus to execute the control content(s) determined.

Such the control information is transmitted to the portable telephone apparatus of the user through CTI server, and is further transmitted from there to the navigation apparatus. The navigation apparatus executes processing in accordance with the control information received. Thus, the navigation apparatus is remotely controlled by the information center.

With such the service system, the user can be free from troublesome operations of using an operation panel of the navigation apparatus, such as a point display, POI (Point Of Interest: information about facilities or the like of genres of interest) information display, as well as, setting of a goal or destination thereof, etc.

In such the conventional service system as was mentioned above, the information center side transmits the control information for use of remote control of the navigation apparatus at the user's end, with using the telephone line that is established by the user side for transmitting the requested service content(s) to the information center. Namely, noticing of the requested content(s) of service from the user side to the information center side, as well as, transmission of the control information from the information center side to the user side, are conducted by using the same telephone line.

For this reason, with such the conventional service system as was mentioned above, it is impossible to receive the service contents requested from a communication terminal other than the navigation apparatus (i.e., the portable telephone apparatus dismounted from the navigation apparatus, a stationary telephone apparatus at home, or a network terminal connected to the information center through the network, such as the Internet, etc., for example), thereby to control the navigation apparatus remotely. For example, though informing the service content(s) which she/he requires from her/his home to the information center in advance, however the user cannot make the remote control on the navigation apparatus in accordance with the service content(s) which was/were received in advance, if thereafter she/he tries to operate or use the navigation apparatus. Thus, it is inferior in usability thereof.

SUMMARY OF THE INVENTION

The present invention is made by taking the situations mentioned above into the consideration, and an object according to the present invention is to provide a remote control of the on-vehicle apparatus, in accordance with the request received from a communication terminal other than the on-vehicle apparatus, such as the navigation apparatus, for example.

In more details, according to the present invention, there is provided a remote control apparatus, for controlling an on-vehicle equipment in accordance with a request made from a communication terminal, comprising: a request receiver portion for receiving an ID information and control content from said communication terminal; a register portion for registering therein control information for causing said on-vehicle equipment to execute the control content received by said request receiver portion, corresponding to the ID information received by said request receiver portion; and a control information transmitter portion for receiving the ID information from said on-vehicle equipment and for transmitting the control information, being registered in said register portion corresponding to the ID information received, to said on-vehicle equipment.

With application of such the structure as mentioned above, a user can register the control content on said on-vehicle equipment, which she/he wishes, in advance, corresponding to the ID information (for example, a user ID), into said remote control apparatus, by using the communication terminal mentioned above (i.e., a portable telephone apparatus detached from the on-vehicle equipment, a stationary telephone apparatus at home, or an Internet terminal, being connected with the remote control apparatus through a network, such as the Internet, etc., for example), different from said on-vehicle equipment. And, when using the on-vehicle equipment mentioned above, the user can make said on-vehicle equipment execute the processing in accordance with the control content, being registered into said remote control apparatus in advance, by accessing to said remote control apparatus to transmit the ID information thereto (of course, such the processing can be automated). Accordingly, it is possible to obtain the remote control of said on-vehicle equipment, in accordance with the request received from said communication terminal separate from said on-vehicle equipment.

Further, in the remote control apparatus according to the present invention, there may be further provided a providing portion for executing the processing, being necessary for the on-vehicle equipment to execute the control content in accordance with said control information, thereby providing an execution result thereof. Herein, the necessary processing mentioned above corresponds to, for example, a point search process if the control content in accordance with said control information is the point display control, a POI search process if it is the POI information display control, and a route search process if it is the route display or guidance control.

And, in this case, said register portion makes said providing portion execute said processing, in a case where said processing can be provided without information from said on-vehicle equipment executing said control content, regarding the processing necessary upon executing the control content in accordance with said control information, thereby registering an execution result thereof together with said control information corresponding to the ID information thereof. Herein, the case where said processing can be provided without the information from said on-vehicle equipment executing said control content, regarding the processing necessary upon executing the control content in accordance with said control information, corresponds to, for example, a case where the point search process, the POI (Point Of Interest) process, or the route search process can be executed without using a present location which is measured by said navigation apparatus.

Also, upon receipt of an execution request from said on-vehicle equipment, said providing portion makes said register portion check whether the execution result is registered in said register portion or not, corresponding to the ID information which said control information transmitter portion receives from said on-vehicle equipment, thereby transmitting the execution result if it is registered, or transmitting an execution result after executing said processing if not.

With doing so, it is possible to provide the function and the execution result thereof to said on-vehicle equipment, as soon as possible, in the case where the control content indicated by the control information, which said remote control apparatus sends to said on-vehicle equipment, is one using the function provided by said remote control apparatus, and where said remote control apparatus can execute it's function without the information of said on-vehicle equipment.

Also, with the remote control apparatus according to the present invention, it is possible to make said control information transmitter portion receive the ID information from said on-vehicle equipment and produces a menu information for causing an arbitrary one to be selected among the various kinds of control information, being registered in said register portion corresponding to the ID information received, thereby transmitting the menu information to said on-vehicle equipment, as well as, transmitting the control information indicated by a select information received from said on-vehicle equipment to said on-vehicle equipment.

With doing so, it is possible for the user to register the control contents in plural number thereof, upon the on-vehicle equipment, which she/he requires, into said remote control apparatus with making correspondence to the ID information thereof. And, when using or starting the on-vehicle equipment mentioned above, she/he can select any one from the plural number of control contents registered in advance, thereby enabling execution of the processing corresponding to or depending upon the control content selected.

Further, as an on-vehicle equipment, being controllable by such the remote control apparatus, remotely, according to the present invention, there is provided a remote control apparatus, as described in the above, further comprising: a menu process portion for displaying a menu screen for selection of the control information in accordance with the menu information, being transmitted from said control information transmitter portion responding to transmission of the ID information to said control information transmitter portion of said remote control apparatus therefrom, and for transmitting the select information indicative of the control information which an operator selects through said menu screen, to said control information transmitter portion; and a control process portion for executing the control content in accordance with the control information, being transmitted from said control information transmitter portion responding to the select information which said menu process portion transmits.

And, said control process portion transmits the execution request of the processing, being necessary upon executing the control content in accordance with said control information, to said providing portion of said remote control apparatus, so as to obtain the execution result of said processing from said providing portion, and thereby executing the control content in accordance with said control information with using said execution result.

BRIEF DESCRIPTION OF THE DRAWINGS

FIG. 2 is a functional structure view of a service center 10 shown in FIG. 1 mentioned above;

FIG. 3 is a view for showing contents entered or registered into a control information DB 105 shown in FIG. 2 mentioned above;

FIG. 6 is the functional structure view of the on-vehicle equipment 20 shown in FIG. 1 mentioned above;

FIG. 7 is a view for showing the hardware structure of the on-vehicle equipment 20 shown in FIG. 6 mentioned above;

DETAILED DESCRIPTION OF PREFERRED EMBODIMENTS

Hereinafter, explanation will be made on an embodiment according to the present invention.

Figure 1:
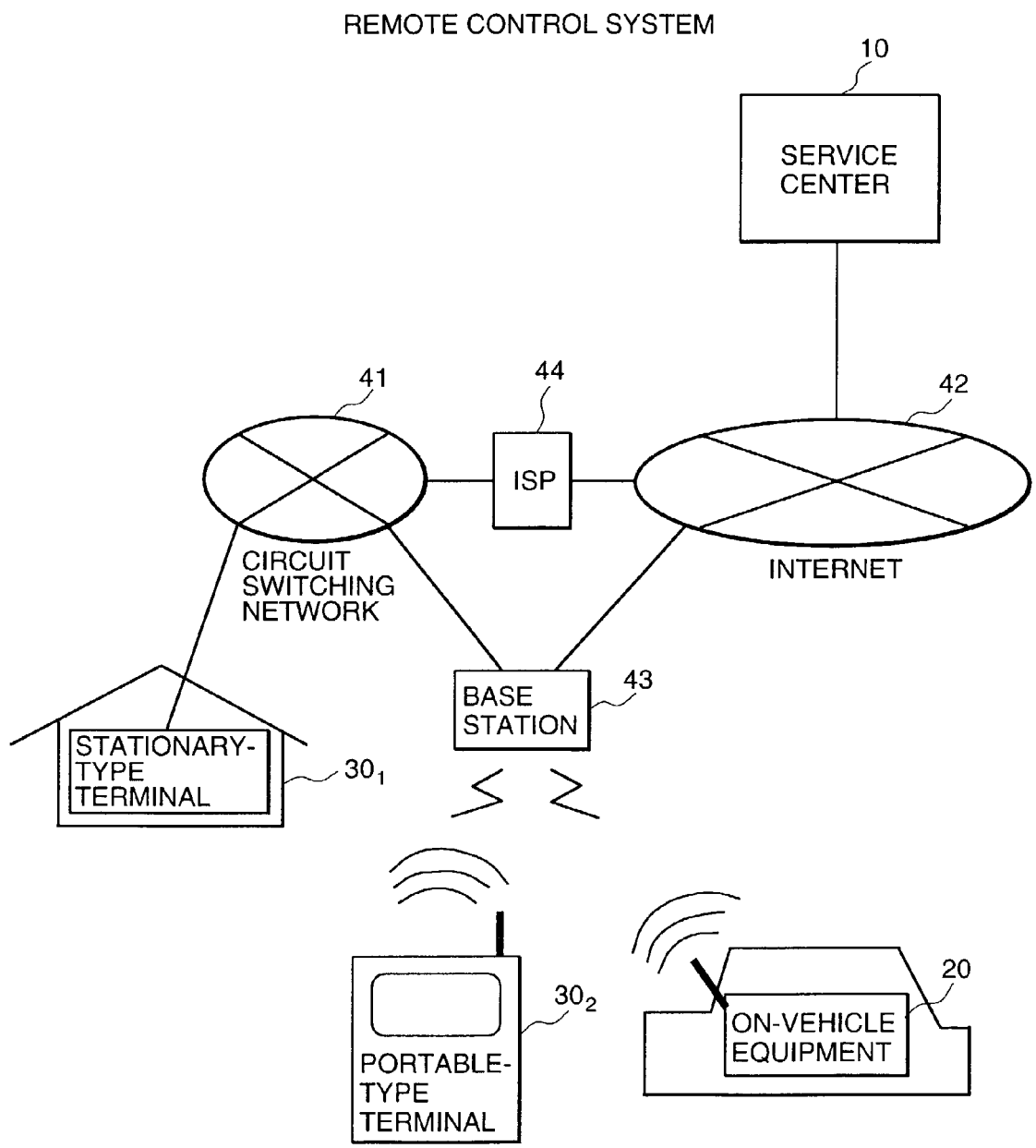
FIG. 1 is an outlook view of a remote control system, in which is applied an embodiment according to the present invention.

FIG. 1 is an outlook view of a remote control system, in which is applied an embodiment according to the present invention.

In this FIG. 1, a service center 10, having received a control content(s) in advance, which is/are transmitted from a user(s) through a stationary-type terminal $30_1$ and/or a portable-type terminal $30_2$, controls the on-vehicle equipment 20, remotely, in accordance with the control content(s), which was/were received in advance, when the user starts or use the on-vehicle equipment 20.

The on-vehicle equipment 20 is structured, so that a wire-less communication device of the portable telephone apparatus, etc., can be built-in or attached on an outside thereof, therefore being connectable to the Internet 42 via a circuit switching network 41 and an ISP 44. And, it conducts processing in accordance with the control information received from the service center 10. In the present embodiment, as the on-vehicle equipment 20 is assumed a navigation apparatus, which can performs a POI display and/or a route guidance display, etc. However, in the case where a radio base station 43 provides the Internet connection service, the on-vehicle equipment 20 can be connected with the Internet 42, directly, but through the radio base station 43.

The stationary-type terminal $30_1$ is a stationary-type network terminal, such as a PC (Personal Computer), etc., for example, building in or mounting the communication device, such as a modem, for example, on an outside thereof, and it can be connected with the Internet 42, via the circuit switching network 41 and the ISP (Internet Service Provider) 44. Also, the portable-type terminal $30_2$ is a portable-type network terminal, such as a PDA (Personal Digital Assistance), etc., building in or mounting the wire-less communication device of the portable telephone apparatus on an outside thereof, and it can be connected with the Internet 42, via the radio base station 43, the circuit switching network 41 and the ISP 44. Further, in the case where the radio base station 43 provides the Internet connection service, it can be connected to the Internet 42 directly, but through the radio base station 43.

At the stationary-type terminal $30_1$ and the portable-type terminal $30_2$ can be used the existing Internet terminals, having function of reading the information, such as the Web browser, etc., for example, and of transmitting information by using the CGI (Common Gateway Interface) and/or the Java (trademark). Then, detailed description will be omitted herein on those terminals.

Next, explanation will be given on the service center 10.

FIG. 2 is the functional structure view of the service center 10.

A request receiver portion 101 has a function of publishing the information of the Web server, etc., and it displays the screen for accepting various information from the user(s), through the Internet 42 on the stationary-type terminal $30_1$ and/or the portable-type terminal $30_2$ accessing thereto (hereinafter, being called by an "access terminal"). And, it receives various information from the user(s), with using the CGI and the Java, for example, thereby to conduct the processing therewith.

In more details, the request receiver portion 101 transmits the information produced in the form of the HTML (Hyper-Text Markup Language), so as to display a screen for inputting ID information on the access terminal. And, it receives or accepts the ID information from the access terminal of the user, thereby searching out or check whether this ID information is registered or not in a user ID DB (database) 104 registering the ID information therein, on which the service center 10 is available for the user, i.e., conducting certification of the user.

Also, the request receiver portion 101 transmits the information, being produced in the form of the HTML for displaying a receipt screen of control contents on the access terminal, towards the access terminal. And, receiving or accepting the control content of the on-vehicle equipment 20 from the access terminal of user, it produces the control information for bringing or causing the on-vehicle equipment 20 to execute the processing in accordance with this control content. Then, it registers or enters the control content accepted, as well as, the control information produced, into a control information DB 105, attaching the ID information of the user of the access terminal therewith.

FIG. 3 shows an example of contents registered in the control information DB 105. In this example, it comprises: a field 1051 for registering therein the ID information of the user, which is received from the access terminal; a field 1052 for registering therein the control contents, which are accepted or received from the access terminal; a field 1053 for registering therein the control information to make the on-vehicle equipment 20 execute the processing corresponding to or depending on the control contents; a field 1054 for registering therein results of execution of the processing, being necessary upon bringing the on-vehicle equipment 20 to execute the processing corresponding to or depending on that control information, and being executable in advance by a providing portion 103, which will be mentioned later; and a field 1055 for registering a flag indicative of if the on-vehicle equipment 20 is under the remote control operation or not, upon the basis of that control information, thereby making up one (1) record thereof.

Also, the field 1053 includes: a field 10531 for registering therein a control command for controlling the on-vehicle equipment 20; and a field 10532 for registering therein a parameter(s) of the control command.

In the present embodiment, the navigation apparatus is assumed to be that on-vehicle equipment 20. Then, in the present embodiment, there are prepared the control commands for executing various processing in relation with the navigation, including: a control command DIS_POS for bringing the on-vehicle apparatus 20 to conduct a point display; a control command DIS_POI for bringing the on-vehicle equipment to conduct a POI display; and a control command DIS_RUT for bringing the on-vehicle equipment 20 to conduct a route guidance, respectively.

Also, the parameter is determined in the kind thereof, depending upon that of the control commands. For example, in case of the control command DIS_POS, the coordinate information (or a special value for indicating that, if being the vehicle position) is set as the parameter(s) thereof, for identifying the display point. In case of the control command DIS_POI, the information for identifying the genre of point information to be displayed, as well as, the information for identifying the area (or a special value for indicating that if being in the vicinity of the vehicle position) are set as the parameters thereof. And, in case of the control command GUI_RUT, the coordinate information is set as the parameter(s) thereof, for identifying a goal thereof.

As was mentioned in the above, in the field 1054 is registered the result on execution of the processing, being necessary upon bringing the on-vehicle equipment 20 to execute the processing depending upon the control information registered in the field 1052, and also executable in advance by the providing portion 103, which will be mentioned later. Herein, the processing executable in advance by the providing portion 103 means that the processing is executable in advance to the time when the control information is transmitted to the on-vehicle equipment 20 from a control information transmitter portion 102, which will be mentioned later. With the present embodiment, in the case where the control content registered in the field 10352 uses no information received from the on-vehicle equipment 20, thus, it corresponds to a case where the control command other than the control command GUI_RUT for use of the route guidance is already registered in the field 10531, and where the parameter(s) registered in the field 10532 does not include the vehicle position therein.

The control information transmitter portion 102 also has a function of publishing the information of the Web server, etc., for example, as in the same manner of the request receiver portion 101 (however, it is the URL (Uniform Resource Locator), differing from the request receiver portion 101), and it displays the screen for accepting various information from the user of the on-vehicle equipment 20, who accesses thereto via the Internet 42. And, for example, by using the CGI and/or the Java, it conducts the processes for receiving or accepting the various kinds of information from the on-vehicle equipment(s) 20.

In more details, the control information transmitter portion 102 receives the ID information from the on-vehicle equipment 20, and makes search on all records registered in the field 1051, starting from the control information DB 105. And, it produces a menu screen for selecting a record arbitrarily, from each of the records detected, and menu information for bringing the on-vehicle equipment 20 to display it thereon, in the format of HTML. Then, this menu information is transmitted to the on-vehicle equipment 20, and receives select information of the record(s) from the on-vehicle equipment 20. And, within the control information DB 105, the flag indicative of "valid" is registered into a field 1055 of the selected record, which is indicated by this selection information, and also the control information is read out from the field 1053 of this record, to be transmitted to the on-vehicle equipment 20.

Figures 4, 5:
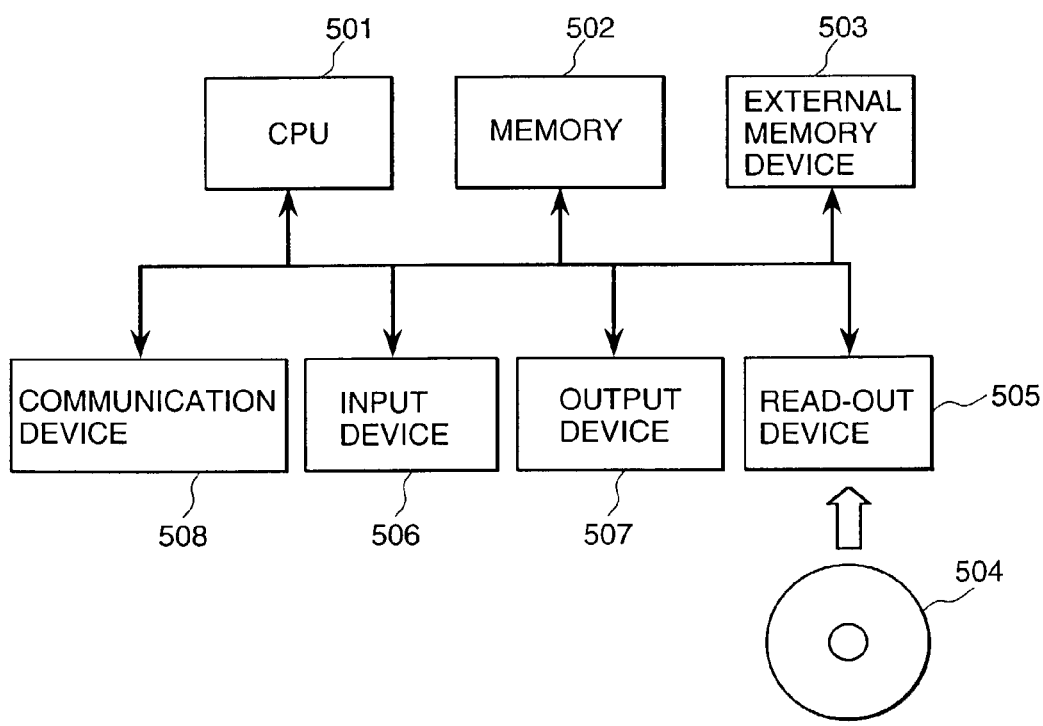
FIG. 4 is a view for showing an example of description of control information, which is described in the form of HTML in the similar manner to menu information, in case of being transmitted from a navigation apparatus 10 to an on-vehicle equipment 20.
FIG. 5 is a view for showing an example of hardware structure of the service center 10 shown in FIG. 2 mentioned above.

Further, according to the present embodiment, it is assumed that the HTTP (HyperText Transfer Protocol) is applied to the communication between the control information transmitter portion 102 and the on-vehicle equipment 20. Then, as shown in FIG. 4, the control information is described in the format of XML (extensible Markup Language), to be transmitted to the on-vehicle equipment 20. However, a tag used in transmission of the control information is assumed to be in a format, which cannot be interpreted by the information reading function, such as the Web browser, etc., which is installed into the on-vehicle equipment 20.

When a new record is added into the control information DB 105, the providing portion 103 begins to search or check whether the information from the on-vehicle equipment 20 is used or not, in the control content which is registered in the field 1352 of this record. In more details, it is checked on whether the control command registered in the field of this record is one of the control commands or not, other than the control command GUI_RUT for the route guidance. If it is the control command other than the control command GUI_RUT, it is further searched or checked if the parameter(s) registered in the field 10532 of this record includes the vehicle position or not therein. And, if in the field 10531 is registered the control command other than the control command GUI_RUT, and also if in the field 10532 is registered the parameter containing no vehicle position therein, it is decided that the control content registered in the field 1352 does not utilize the information from the on-vehicle equipment 20, thereby identifying the processing needed to make the on-vehicle equipment 20 execute the processing corresponding to or depending on the control information registered in the field 1053 of this record, and the execution thereof begins. Then, the result of this execution is registered into the field 1054 of this record.

In the present embodiment, for the processing being necessary upon bringing the on-vehicle equipment 20 to execute the processing corresponding to or depending on the control information, the following processes are assumed: i.e., a searching process of a point identified by the parameter(s), in the case of the control command DIS_POS; a POI searching process under the search condition of the area and genre identified by the parameter(s), in the case of the control command DIS_POI; and a route searching process from the location of the vehicle to the goal identified by the parameter(s), in the case of the control command GUI_RUT. For this reason, in the providing portion 103 are provided a point search portion 1031, a POI search portion 1032, and a route search portion 1033.

The point search portion 1031 searches the point information from the point information DB 108 upon the basis of the coordinate information designated. Herein, in the point information DB 108 are registered detailed information of each of the points (i.e., names, such as the name of place or the facility name, addresses, contact points, such as the telephone number and the URL, etc., and information including guide information or the like, for example), corresponding to the coordinate information of that point and the genre, (i.e., parks, food and drink facilities, leisure facilities, lodging facilities, etc., for example), to which that point belongs. The point search portion 1031 reads out the detailed information, being registered in the point information DB 108 corresponding to the coordinate information of the point designated or the coordinate information in the vicinity thereof, in the form of the point information.

The POI search portion 1032 reads out the detailed information, being registered in the point information DB 108 corresponding to the genre designated and to the coordinate information contained in the area designated, as the POI information.

The route search portion 1033 makes a search on a recommendable route between two (2) points designated, by using the route information DB 107, in which the route information is registered, applying such as the Dykestra method or the like, for example.

Also, the providing portion 103 conducts the processing in accordance with various kinds of execution requests transmitted from the on-vehicle equipment 20 through the Internet 42, and transmits the execution result back to the on-vehicle equipment 20. Herein, the various kinds of execution requests transmitted from the on-vehicle equipment 20 include the various execution requests, such as a map information request, for example, being necessary for the navigation processing, other than those for the point search, the POI search, and the route search mentioned above. For example, when a request for the map information is received from the on-vehicle equipment 20, the requested map information is read out from the map information DB 106, thereby to be transferred to the on-vehicle equipment 20.

However, if the providing portion 103 contains the records within the control information DB 105, which registers the ID information of the user received from the on-vehicle equipment 20 in the field 1051, the execution result in the field 1054, and the "valid" flag in the field 1055, and further if the execution request transferred to the said on-vehicle equipment 20 is of the processing necessary to make the on-vehicle equipment 20 execute the process, in accordance with the control information registered in the field 1053, then the providing portion 103 transfers the execution result registered in the field 1054 to the said on-vehicle equipment 20, in the place of conducting the processing in accordance with the said execution request. Also, the flag of the field 1055 of this record is changed from the "valid" to the "invalid".

The service center 10 mentioned above may be constructed upon a computer having general configuration, as shown in FIG. 5, for example, or upon a computer system comprising such the computers in plural number thereof, wherein each comprises: a CPU 501; a memory 502; an external memory device 503, such as a hard disc drive, etc., for example; a read-out device 505 for reading out data from a memory medium 504 being portable, such as a CD-ROM, a DVD-ROM, etc., for example; an input device 506, such as a keyboard and/or a mouse, etc., for example; an output device 607, such as a monitor or the like, for example; a communicating device 508 for making communication through the Internet 42; and buses 509 for connection between those. The program for building up the service center 10 upon such the computer or the computer system may be loaded from the external memory device 503, or from the memory medium 504 through the read-out device 15, onto the memory 502, thereby allowing the CPU 501 to execute. Alternatively, the program may be loaded onto the memory 502 from the Internet 42 through the communication device 508, thereby to be executed by the CPU 501.

Next, explanation will be given on the on-vehicle equipment 20.

FIG. 6 shows the functional structure of the on-vehicle equipment 20.

A communication portion 201 carries out radio or wire-less communication between the base station 43. This communication portion 201 may be a wire-less communicator built within the on-vehicle equipment 20, or alternatively may be a wire-less communicator, which can be attached on an outside of the on-vehicle equipment 20, such as the portable telephone apparatus, etc., for example.

A display process portion 204 displays a picture and characters on a display screen, with controlling the display device thereby, such as of a liquid crystal display, etc., in accordance with instructions receiving from a menu process portion 202 and a navigation process portion 203, which will be mentioned later.

The menu process portion 202, having a function of reading the information, such as the Web browser, etc., obtains the information from the control information transmitter portion 102 of the service center 10, thereby displaying a screen while controlling the display process portion 204 in according with the instructions of this information. Also, it transfers the information receiving from the user through the input device, such as an operation panel, etc., to the control information transmitter portion 102 with using the CGI and the Java.

In more details, the menu process portion 202 makes access to the control information transmitter portion 102 through the communication portion 201, thereby transmitting the ID information of the user, which is registered in advance, or received from the user through the input device, to the control information transmitter portion 102. And, in accordance with the menu information (in the format of the HTML document), which is transmitted from the control information transmitter portion 102 responding thereto, a menu screen is displayed on the display device, for a user to select one to be executed by the on-vehicle equipment 20 among those control contents registered in advance, with using the stationary-type terminal $30_1$ and/or the portable-type terminal $30_2$.

Also, the menu process portion 202 transmits the control content, being selected by the user on the menu screen through the input device, to the control information transmitter portion 102. And, it receives the control information from the control information transmitter portion 102. Herein, as shown in FIG. 4 mentioned above, the control information transmitted from the control information transmitter portion 102 is described in the XML format with using the tag, which cannot be interpreted by the information reading function, such as the Web browser, etc. For this reason, the menu process portion 202 cannot interpret the tag of the control information received from the control information transmitter portion 102. Then, according to the present invention, the menu process portion 202 is so constructed that it transfers such the non-interpretable information to the navigation process portion 203, which will be mentioned later.

The navigation process portion 203 calculates out a present location (or the vehicle position) of the vehicle, periodically, on which the on-vehicle equipment 20 is mounted, by using sensor information obtained from various kinds of on-vehicle sensors, such as a car speed sensor, a gyro sensor, etc., for example, or the GPS information obtained from the GPS (Global Positioning System) receiver connected to the on-vehicle equipment 20.

Also, the navigation process portion 203 executes the various processes necessary for navigation, in accordance with the control information received from the menu process portion 202.

In more details, if the control information received from the menu process portion 202 is of the point display (i.e., the control command DIS_POS), the navigation process portion 203 makes the search request on the providing portion 103 of the service center 10, upon the point which is identified by the parameter(s) contained within this control information (if the said point is the vehicle position, it is the present location calculated by the menu process portion 202). And, while controlling the display controller portion 204, the point information received from the providing portion 103 is displayed, together with the map information in the vicinity of or around that point registered in the map information DB 205. In this instance, if the map information around that point is not registered in the map information DB 205, the navigation process portion 203 makes a request thereupon to the providing portion 103, thereby obtaining the map information from the providing portion 103, to register it into the map information DB 205 thereof.

Also, if the control information received from the menu process portion 202 is of the POI display (i.e., the control command DIS_POI), the navigation process portion 203 makes the POI search request under the search condition of the genre and the area, which can be identified by the parameter(s) contained in this control information (or the area around the present location calculated out by the menu process portion 202, in the case where the said area is in the vicinity of or around the vehicle position), to the providing portion 103 of the service center 10. And, it controls the display controller portion 204, thereby displaying the POI information received from the providing portion 103.

Also, if the control information received from the menu process portion 202 is of the route guidance (i.e., the control command GUI_RUT), the navigation process portion 203 makes the route search request, starting from the present position calculated out by the navigation process portion 202, as the starting point, and reaching up to the goal identified by the parameter(s) contained within the control information, to the providing portion 103 of the service center 10. And, it controls the display controller portion 204, thereby displaying the route guidance screen, with using the route information received from the providing portion 103, the present location calculated by the navigation process portion 202, and the map information in the vicinity of the present location, which is registered in the map information DB 205. In this instance, if the map information in the vicinity of the present location is not registered in the map information DB 205, the navigation process portion 203 requests it to the providing portion 103, thereby obtaining the map information in the vicinity of the present location from the providing portion 103, to register it into the map information DB 205.

Also, the navigation process portion 203, of course, executes the various navigation processes, in accordance with the instructions received from the user through the input device, such as the operation panel, etc., for example, in the similar manner to the existing navigation apparatus.

The on-vehicle equipment 20 mentioned above may be constructed upon a computer, as shown in FIG. 7, for example, comprising: a CPU 701; a RAM 702; a ROM 703; a memory card IF (Interface) 704 for connecting a memory card 710 thereto; sensor IF 705 for connecting the various kinds of on-vehicle sensors and the GPS receiver thereto; an input device 706, such as the operation panel, etc., for example; a display device 707, such as a liquid crystal display, etc., for example; a wire-less communicator driver 708 for controlling the wire-less communicator, such as of the portable telephone apparatus, etc., for example; and buses 709 for connection between those. Also, the program for building up such the on-vehicle equipment 20 upon the computer may be loaded onto the RAM 702 from the ROM 703, or the memory card 710 connected to the memory card IF 704, thereby allowing the CPU 704 to execute. Alternatively, the program may be loaded on to the RAM 702 from the Internet 42 through the wire-less communicator driver 708, thereby to be executed by the CPU 701.

Next, explanation will be given on the operation of the remote control system, having such the structure as was mentioned above.

First, explanation will be given on steps for registering or entering the control contents for the on-vehicle equipment 20.

Figure 8:
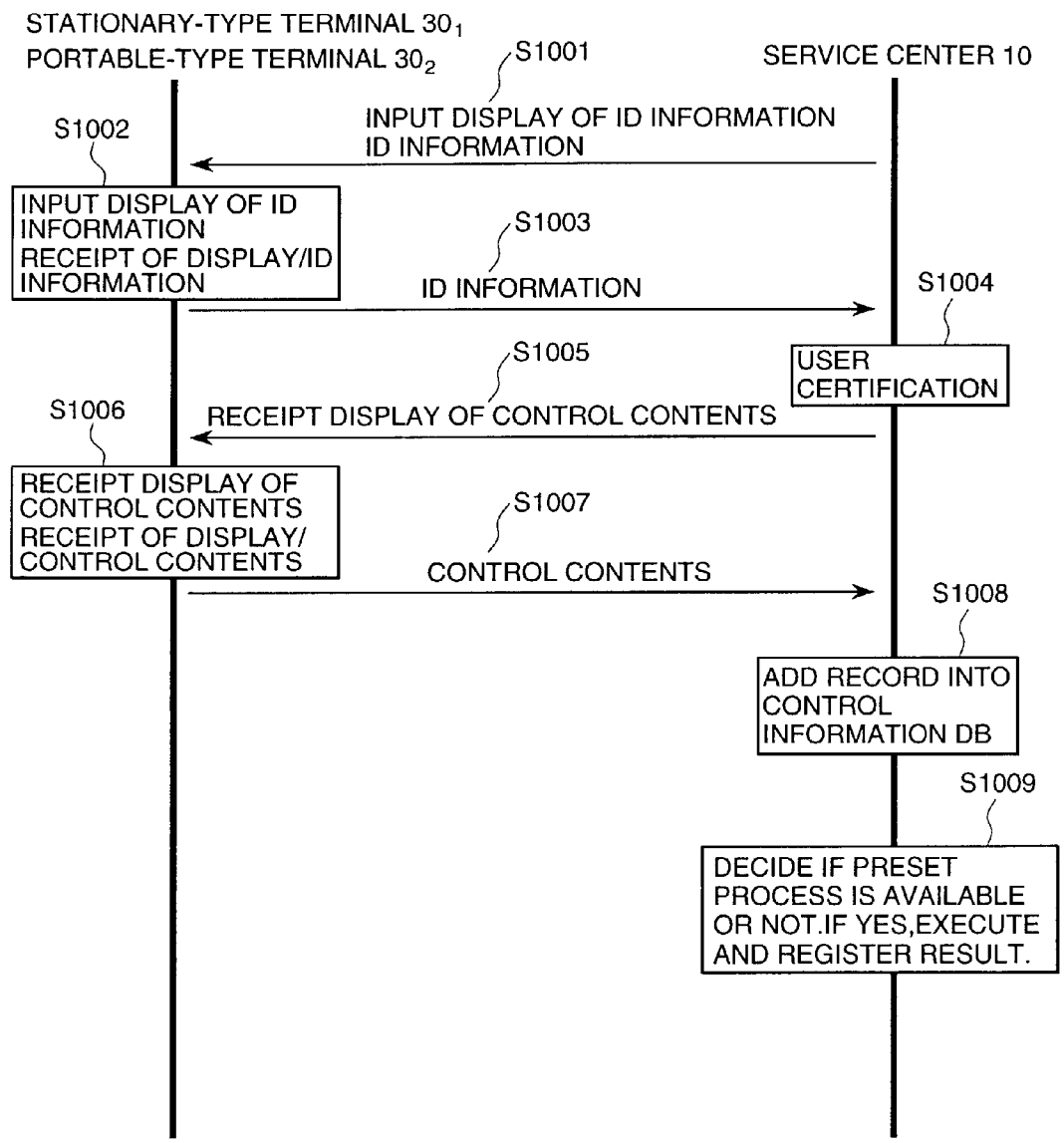
FIG. 8 is a view for showing an operation sequence for entering or registering the control content(s) in the on-vehicle equipment 20.

FIG. 8 shows an operation sequence of the steps for registering the control contents of the on-vehicle equipment 20.

First, a request receiver portion 101 of the service center 10 transmits information for displaying an input screen of ID information on the terminal (S1001), which is produced in the HTML format, when being accessed by the access terminal through the Internet 42.

Upon receipt of this, the access terminal displays the input screen of the ID information on the display device thereof, and receives the ID information from the user (S1002). Then, it sends the ID information received to the request receiver portion 101 of the service center 10 (S1003).

When receiving the ID information from the access terminal through the Internet 42, the request receiver portion 101 of the service center 10 makes search or check if this ID information is already registered or not in the user ID DB 104 (S1004). If not registered therein, it is decided that the user certification is not established, and it sends back an error message of that meaning to the access terminal. On the other hand, if being registered therein, it is determined that the user certification is already established, and it sends information for allowing the access terminal to display a receipt screen for control contents (S1005).

Upon receipt of this, the access terminal displays the receipt screen for control contents on the display device, and it receives the control content to be executed by the on-vehicle equipment 20 from the user (S1006). And, it sends the control content received to the request receiver portion 101 of the service center 10 (S1007).

FIGS. 9(a) to 9(f) show an example of the receipt screen for control contents, which is displayed on the display device of the access terminal.

Fog. 9(a) shows an example of the receipt screen for control contents, which is displayed on the access terminal first. For the user of the access terminal, it is possible to scroll a list 903a of respective kinds of controls, by operating a scrollbar 901 with using the input device, such as of operation buttons, etc., for example. And, it is also possible to select a kind of control at desire with shifting a cursor 902 by using the input device. When selection is made on the kind of control in FIG. 9(a), the access terminal transmits that kind selected to the request receiver portion 101 of the service center 10. Upon receipt of this, the request receiver portion 101 of the service center 10 displays the control content on the access terminal, being different depending upon the kind of control selected.

FIGS. 9(b) and 9(c) show an example of the receipt screen for control contents (i.e., POI display setting) when the POI display is selected in FIG. 9(a) mentioned above. Operating the scrollbar 901 on the screen shown in FIG. 9(b), so as to scroll it up to a list 903b of the area of POI at her/his wish, the user of the access terminal is able to move the cursor 902 to the area at her/his desire, thereby achieving the selection thereof. Also, operating the scrollbar 901 on the screen shown in FIG. 9(c), so as to scroll it up a list 903c of genres of POI at her/his wish, she/he can move the cursor 902 to the genre desired, thereby achieving the selection thereof. If the selection is made on the area and the genre in FIGS. 9(b) and 9(c), the access terminal transmits the area and the genre to the request receiver portion 101 of the service center 10. With this, it means that the request receiver portion 101 completes the reception of the control content (i.e., the POI display (genre, area)) from the access terminal.

FIGS. 9(d) to 9(f) show an example of the receipt screen of control contents (i.e., point display setting/route guidance setting), in the case where the point display or the route guidance is selected in FIG. 9(a). Herein, what is shown in FIGS. 9(d) and 9(e) is same to the receipt screen of control contents (i.e. the POI display setting) shown in FIGS. 9(b) and 9(c) mentioned above. When being made on selection of the condition (i.e., on the genre, and/or the area) of the point desired, the access terminal transmits that condition to the request receiver portion 101 of the service center 10.

Upon receipt of this, the request receiver portion 101 of the service center 10 makes a search request to the POI search portion 1032, upon the pint information satisfying the condition received from the access terminal. Then, on the basis of the search result received from the POI search portion 1032, it produces information for allowing the access terminal to display the screen (see FIG. 9(f)), so as to make an arbitrary selection of a point among the points satisfying that condition (i.e., the point to be displayed in the case of the point display, or the goal in the case of the route guidance), and thereby transmitting it. Scrolling a list 903*d* of the display points and the goals by operating the scrollbar 901 on the screen shown in FIG. 9(*f*), thereby moving the cursor 902 onto the display point or the goal at her/his desire, the user of the access terminal can make the selection on this. When the selection is made on the display point and the goal in FIG. 9(*f*), the access terminal transmits that display point and the goal to the request receiver portion 101 of the service center 10. With this, it means that the request receiver portion 101 completes the reception of the control content (i.e., the display point (display point) or the route guidance (the goal)) from the access terminal.

Figure 9:
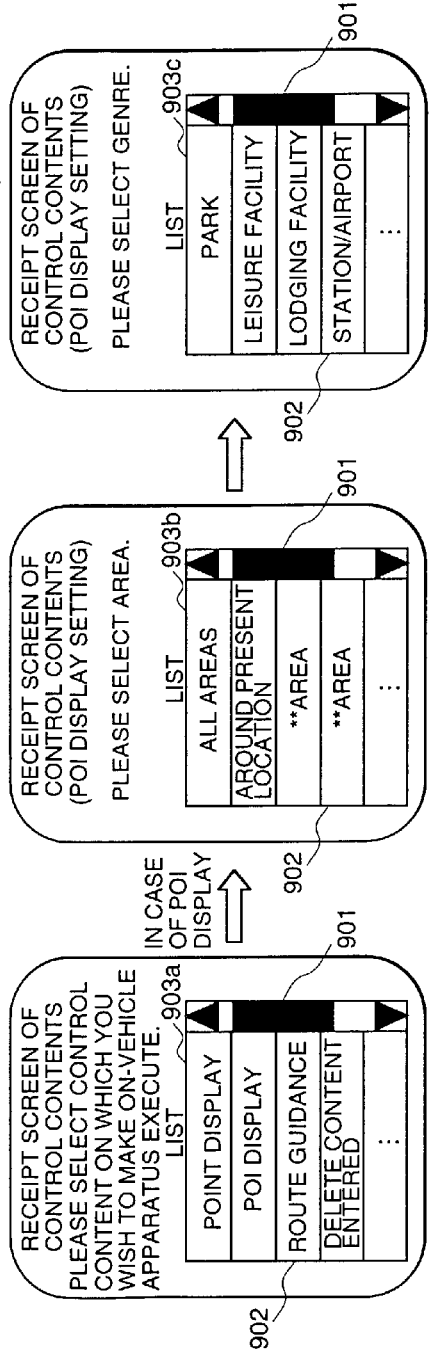
FIGS. 9(a) to 9(f) are views of examples of receipt screens of the control content being displayed on a display device of an access terminal.

However, in FIGS. 9(*a*) to 9(*f*), it is assumed the case where the access terminal is the portable-type telephone apparatus $30_2$. For determining on which display should be made on the display of the receipt screen for control contents, i.e., on the display of the portable-type terminal $30_2$ or of the stationary-type terminal $30_1$, it is sufficient to prepare the URLs of the receipt screen for control contents for use in the portable-type terminal $30_2$ and for use in the stationary-type terminal $30_2$, in the request receiver portion 101 of the service center 10.

Then, upon receipt of the control content from the access terminal, the request receiver portion 101 of the service center 10 adds a new record into the control information DB 105 (S1008). Herein, into a field 1051 for the added record is registered the ID information received from the access terminal, into a field 1052 the control content received from the access terminal, into a field 1054 the execution result, i.e., "non", for example, and into a field 1055 a flag indicative of "invalid", respectively. Also, the request receiver portion 101 produces the control information (i.e., the control command and the parameter(s)) depending upon the control content registered into the field 1052, and registers this into a field 1053.

Then, if the new recorded is added into the control information DB 105, the providing portion 103 of the service center 10 makes a search on whether the control command registered in a field 10531 of this record is the control command or not, being other than the control command GUI_RUT for the route guidance. If being the control command other than the control command GUI_RUT, it is further checked if the parameter(s) registered in a field 10532 of this record contains the vehicle position or not. And, if the vehicle position is not included therein, the process is identified, being necessary for bringing the on-vehicle equipment 20 to execute the control command registered in the field 10531 of this record, and the process identified is executed by using the parameter(s) registered in the field 10532. Then, the execution result is registered into a field 1054 of this record (S1009).

In more details, in the case where the control command registered in the field 10531 is the control command DIS_POS for the point display, and also where the parameter(s) registered in the field 10532 is the coordinate information other than the vehicle position, the point information is read out from the point information DB 107, corresponding to the coordinate information being coincide with or in the vicinity of the coordinate information mentioned above, by using the POI search portion 1032, and it is registered into the field 1054 as the execution result thereof.

Also, in the case where the control command registered in the field 10531 is the control command DIS_POI for the POI display, and also where the parameter(s) registered in the field 10532 means a specific area other than the vicinity or neighbor of the vehicle position, the point information is read out from the point information DB 107, by using the POI search portion 1032, satisfying the parameter(s) of the area or the genre registered in the field 10532, and it is registered into the field 1054 as the execution result thereof.

With the steps mentioned in the above, the control content for the on-vehicle equipment 20 is registered into the control information DB 105 of the service center 10, in accordance with the request from the access terminal.

Next, steps for the remote control of the on-vehicle equipment 20 will be explained.

Figure 10:
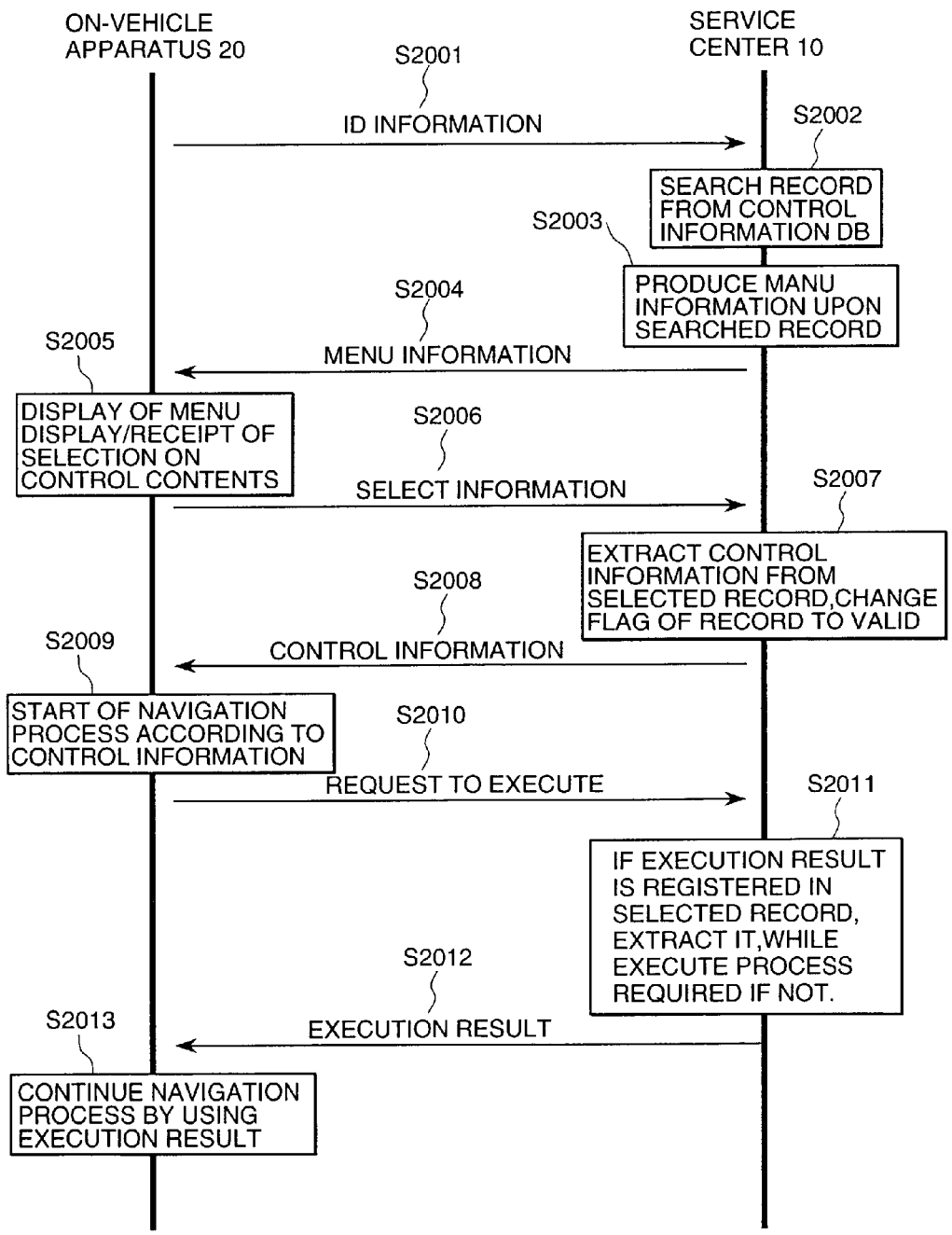
FIG. 10 is a view for showing an operation sequence for the remote control of the on-vehicle equipment 20.

FIG. 10 shows an operation sequence of steps of the remote control of the on-vehicle equipment 20.

First, when a predetermined event occurs, such as a turn-on of power source, a receipt of instruction from the user, etc., for example, the menu process portion 202 of the on-vehicle equipment 20 accesses to the control information transmitter portion 102 of the service center 10, thereby transmitting the ID information of the user, which is registered in advance, or which is received from the user through the input device (S2001).

Upon receipt of the ID information from the on-vehicle equipment 20, the control information transmitter portion 102 of the service center 10 makes search on all the records, in which this ID information is registered in the field 1051, starting from the control information DB 105 (S2002). And, it produces a menu screen for making a selection of an arbitrary one among the control contents, which are registered in the field 1052 of each of the records detected, and menu information for allowing the on-vehicle equipment 20 to display, in the HTML format (S2003). And then, this menu information is transmitted to the on-vehicle equipment 20.

Upon receipt of this, the menu process portion 202 of the on-vehicle equipment 20 controls the display process portion 204, thereby displaying the menu screen on the display device thereof and receive or accept the selection of the control content from the user (S2005). And, the received selection of the control content is transmitted to the control information transmitter portion 102 of the service center 10, as the select information (S2006).

Figure 11:
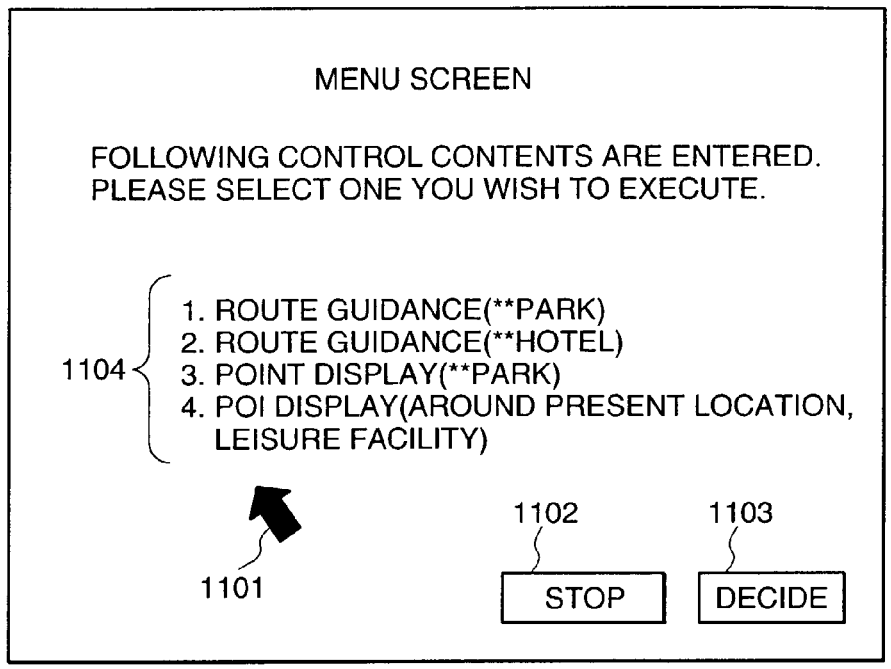
FIG. 11 is a view for showing an example of a menu screen for selection of the control content(s), which is displayed on the display device of the on-vehicle equipment 20.

FIG. 11 shows an example of the menu screen displayed on the display device of the on-vehicle equipment 20.

As is shown in the figure, on the menu screen are displayed a list 1104 of the control contents registered in the field 1052 in each of the records, being registered in the control information DB 105 corresponding to the ID information of the user of the on-vehicle equipment 20. The user can select the desired control content within the list 1104 by operating the cursor 1101 with using the input device. And selection of a decision button 1103 allows the control content selected within the list 1104 to be transmitted to the control information transmitter portion 102 of the service center 10, as the select information. Herein, if a stop button 1104 is selected, the menu process portion 202 ends the display of the menu screen.

Then, if the select information is transmitted from the on-vehicle equipment 20, the control information transmitter portion 102 of the service center 10 detects the record(s) from the control information DB 105, in which the control content indicated by this select information is registered in the field 1052 thereof, and in which the ID information, being received before the on-vehicle equipment 20 receives, is already registered in the field 1051 thereof. And, it changes the flag registered in the field 1055 of the detected record from the "invalid" to the "valid" (S2007). Then, the control information transmitter portion 102 transmits the control information (i.e., the control command and the parameter (s)) registered in the field 1053 of this record to the on-vehicle equipment 20 in the XML format (S2008).

The menu process portion 202 of the on-vehicle equipment 20 cannot interpret the tag(s) of the control information of the XML format, which is received from the service center 10. Then, this control information is transferred to the navigation process portion 203. Upon receipt of this control information from the menu process portion 202, the navigation process portion 203 analyses the tag(s) of this control information, so as to acknowledge the control command and the parameter(s) thereof, and starts the navigation processes in accordance with the control command and the parameter(s) acknowledged (S2009).

In more details, the following processes are conducted, depending upon the control command.

(1) In the case of the control command DIS_POS for point display

The navigation process portion 203 sends an execution request for search on the point identified by the parameter(s) acknowledged (or the present location calculated by the navigation process portion 203, in the case where the said point is the vehicle position), through the transmitter portion 201 to the providing portion 103 of the service center 10 (S2010).

Upon receipt of this, the providing portion 103 of the service center 10 searches or finds out the record from the control information DB 105, in which the ID information of the user received from this on-vehicle equipment 20 is registered in the field 1051 thereof, and in which the "valid" flag is registered in the field 1055 thereof. Then, it checks whether the execution request on the point search transmitted from this on-vehicle equipment 20 is necessary or not, upon bringing the on-vehicle equipment 20 to execute the processing in accordance with the control information registered in the field 1053 of this record detected. Herein, if the control command registered in the field 10531 of the record detected is the control command DIS_POS for the point display, it is determined that the execution request on the point search is necessary, upon bringing the on-vehicle equipment 20 to execute the processing in accordance with the control information registered inn the field 1053 of this record.

Then, when the execution request upon the point search received from the on-vehicle equipment 20 is decided to be the processing, being necessary upon bringing the on-vehicle equipment 20 to execute the processing in accordance with the control information registered in the field 1053 of the record detected, the providing portion 103 of the service center 10 extracts this if the execution result thereof is registered in the field 1054 of this record. On the other hand, if no execution result is registered in the field 1054 of this record, it notifies the execution request upon the point search received from the on-vehicle equipment 20 to the point search portion 1031, so as to make the point search portion 1031 execute the point search process, and it obtains the execution result thereof.

When obtaining the execution result of the execution request on the point search received from the on-vehicle equipment 20, in the manner mentioned above, the providing portion 103 of the service center 10 changes the flag registered in the field 1055 of the record detected from the "valid" to the "invalid" (S2011), and thereafter it transmits the execution result obtained to the navigation process portion 203 of the on-vehicle equipment 20 (S2012).

Upon receipt of this, the navigation process portion 203 of the on-vehicle equipment 20 controls the display process portion 204 thereof, thereby continuing the point display processing by using the execution result of the point search obtained from the providing portion 103 of the service center 10, as well as, the map information in the vicinity of the point displayed, which is registered in the map information DB 205 (S2013).

Figure 12:
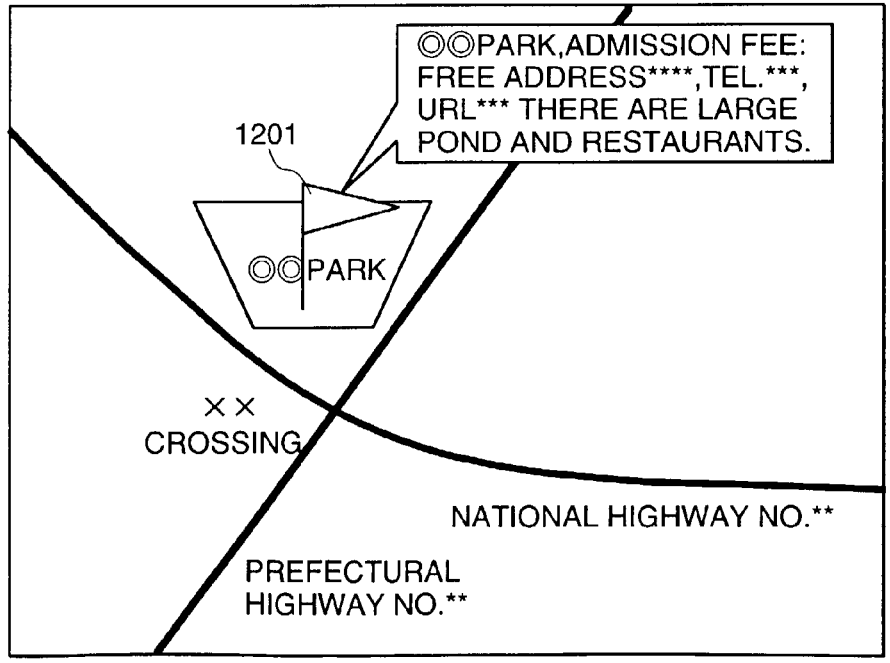
FIG. 12 is a view for showing an example of a point display screen, which is displayed on the display device of the on-vehicle equipment 20.

FIG. 12 shows an example of the point display screen, which is displayed on the on-vehicle equipment 20.

In the figure, a reference numeral 1201 indicates the display point, and the point information of the said point is displayed in a balloon. The map on the point display screen is produced, with using the map information DB 205 of the on-vehicle equipment 20. However, as was mentioned in the above, if the map information in the vicinity of the display point 1202 is not registered in the map information DB 205, that map information can be obtained by requesting it to the providing portion 103, and it is registered in the map information DB 205, and also the map in the vicinity of the display point 1201 is produced by using thereof.

(2) In the case of the control command DIS_POI for the POI display

The navigation process portion 203 transmits the execution request for the POI search under the condition of the genre and the area specified by the parameter(s) acknowledged (in the vicinity of or around the present location calculated out by the navigation process portion 203, in the case where the said area is the vicinity of the vehicle position), through the communicator portion 201 to the providing portion 103 of the service center 10 (S2010).

Upon receipt of this, the providing portion 103 of the service center 10 makes a search on the record, in which the ID information of the user received from this on-vehicle equipment 20 is registered in the field 1051 thereof, and in which the "valid" flag is registered in the field 1055 thereof, starting from the control information DB 105. Then, it checks whether the execution request for the POI search transmitted from this on-vehicle equipment 20 is the necessary processing or not, upon bringing the on-vehicle equipment 20 to execute the processing in accordance with the control information registered in the field 1053 of the record detected. Herein, in the case where the control command registered in the field 10531 of the record detected is the control command DIS_POI for the POI display, the execution request of the POI search is determined to be the necessary processing upon bringing the on-vehicle equipment 20 to execute the processing in accordance with the control information registered inn the field 1053 of this record.

Then, when the execution request for the POI search received from the on-vehicle equipment 20 is decided to be the processing, being necessary upon bringing the on-vehicle equipment 20 to execute the processing in accordance with the control information registered in the field 1053 of the record detected, the providing portion 103 of the service center 10 extract it, if the execution result thereof is registered in the field 1054 of this record. On the other hand, if the execution result is not registered in the field 1054 of this record, it notifies the execution request for the POI search received from the on-vehicle equipment 20 to the POI search portion 1031, so as to make the POI search portion 1032 execute the POI search processing, thereby obtaining the execution result thereof.

When obtaining the execution result upon the execution request for the POI search received from the on-vehicle equipment 20, in such the manner as was mentioned above, the providing portion 103 of the service center 10 changes the flag registered in the field 1055 of the record detected from the "valid" to the "invalid" (S2011), and thereafter transmits the execution result obtained to the navigation process portion 203 of the on-vehicle equipment 20 (S1012).

Upon receipt of this, the navigation process portion 203 of the on-vehicle equipment 20 controls the display process portion 204 thereof, thereby continuing the POI display processing, by using the execution result of the POI search, which is obtained from the providing portion 103 of the service center 10 (S2013).

Figure 13:
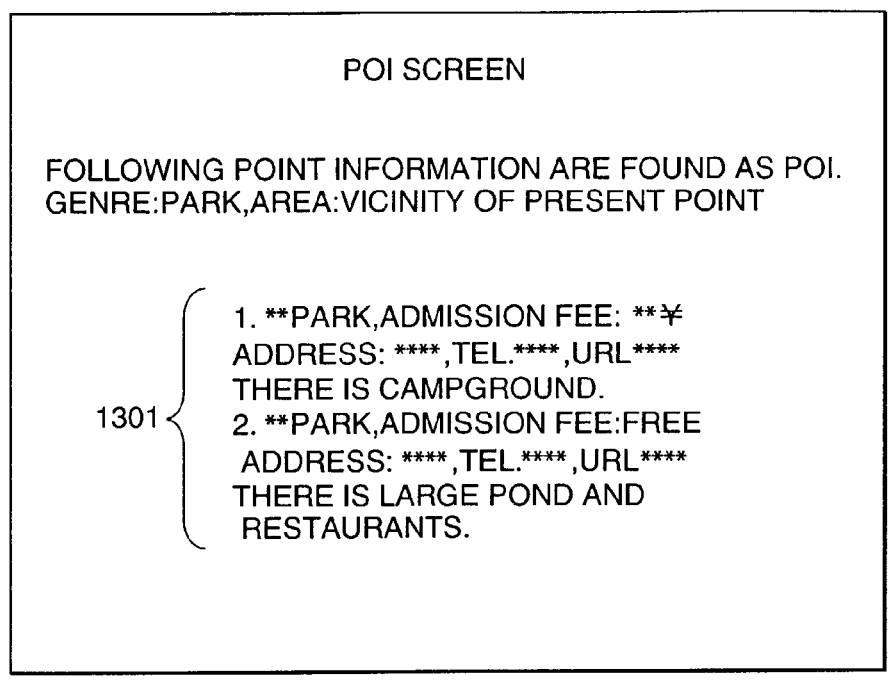
FIG. 13 is a view for showing an example of a POI display screen, which is displayed on the display device of the on-vehicle equipment 20.

FIG. 13 shows an example of the POI display screen, which is displayed on the on-vehicle equipment 20.

As is shown in the figure, on the POI display screen is displayed a list 1301 of the point information of each of the points selected for the POI.

(3) In the case of the control command GUI_RUT for the route guidance

Bringing the point specified by the parameter(s) acknowledged to be as the goal while the present location calculated by the navigation process portion 203 as the starting point, the navigation process portion 203 transmits the execution request for the route search, through the communicator portion 201 to the providing portion 103 of the service center 10 (S2010).

Upon receipt of this, the providing portion 103 of the service center 10 detects the record, in which the ID information of the user received from this on-vehicle equipment 20 is registered in the field 1051 thereof, and in which the "valid" flag is registered in the field 1055 thereof, from the control information DB 105. Then, it checks whether the execution request for the route search transmitted from this on-vehicle equipment 20 is the processing or not, being necessary upon bringing the on-vehicle equipment 20 to execute the processing in accordance with the control information registered in the field 1053 of the record detected. Herein, if the control command registered in the field 10531 of the record detected is the control command GUI_RUT for the route guidance, the execution request for the route search is decided to be the processing, being necessary upon making the on-vehicle equipment 20 execute the processing in accordance with the control information registered in the field 1053 of this record.

Then, if the execution request for the route search received from the on-vehicle equipment 20 is determined to be the processing, being necessary upon making the on-vehicle equipment 20 execute the processing in accordance with the control information registered in the field 1053 of the record detected, the providing portion 103 of the service center 10 notifies the execution request for the route search received from the on-vehicle equipment 20 to the route search portion 1033, so as to make the route search portion 1033 execute the route search processing, thereby obtaining the execution result thereof.

When obtaining the execution result of the execution request for the route search received from the on-vehicle equipment 20, the providing portion 103 of the service center 10 changes the flag registered in the field 1055 of the record detected from the "valid" to the "invalid" (S2011), thereby transmitting the execution result obtained to the navigation process portion 203 of the on-vehicle equipment 20 (S2012).

Upon receipt of this, the navigation process portion 203 of the on-vehicle equipment 20 controls the display process portion 204, thereby continuing the route guidance, with using the execution result of the route search obtained from the providing portion 103 of the service center 10, as well as, the map information in the vicinity of the present location registered in the map information DB 205 (S2013).

Figure 14:
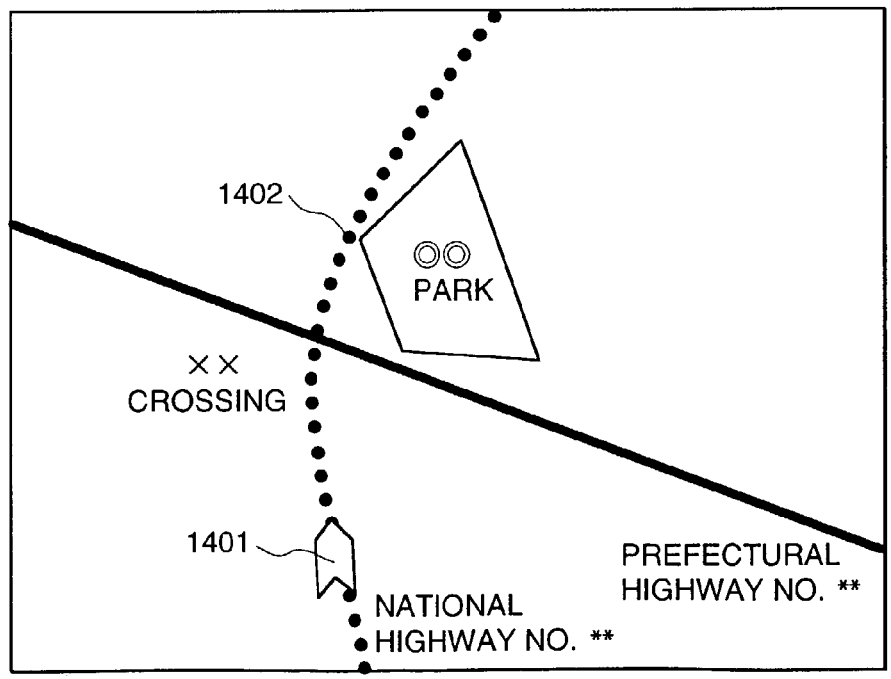
FIG. 14 is a view for showing an example of a route guidance screen, which is displayed on the display device of the on-vehicle equipment 20.

FIG. 14 shows an example of the route guidance screen, which is displayed on the on-vehicle equipment 20.

In the figure, a reference numeral 1401 indicates the vehicle position, and a reference numeral 1402 the route coming up to the goal. The map on the screen is produced with using the map information DB 205 of the on-vehicle equipment 20. However, as was mentioned in the above, if the map information in the vicinity of the vehicle position 1401 is not registered in the map information DB 205, the map information in the vicinity of the vehicle portion 1401 is obtained by requesting it to the providing portion 103, and it is registered into the map information DB 205, and then the map in the vicinity of the vehicle position 1401 is produced with using thereof.

The explanation was made on the one embodiment, according to the present invention, in the above.

According to the present embodiment, it is possible for the user to register the control contents in advance, which she/he wishes to make the on-vehicle equipment 20 conduct, into the service center 10, by using the stationary-type terminal $30_1$ and the portable-type terminal $30_2$, separate from the on-vehicle equipment 20. And, upon using the on-vehicle equipment 20, she/he can make the remote control of the on-vehicle equipment 20, by transmitting the control information from the service center 10 to the on-vehicle equipment 20 for bringing it to execute the processing corresponding to or depending on the control content registered in advance. Thus, it is possible to make the remote control of the on-vehicle equipment 20 in accordance with the request received from the terminal other than the on-vehicle terminal 20.

Also, according to the present embodiment, the control content, which the service center 10 transmits to the on-vehicle equipment 20, is that using the function, which the providing portion 103 of the service center 10 supports or provides, and that the function was executed and the execution result thereof was registered in advance if it is such the function that it can be executed by the providing portion 103 without the information of the on-vehicle equipment 20 (in more details, the vehicle position), therefore it is possible to provide the execution result of that function soon, to the on-vehicle equipment 20.

Also, according to the present embodiment, it is possible for the user to register the control contents in plural number thereof, in advance, for bringing the on-vehicle equipment 20 to execute them. And, upon using the on-vehicle equipment 20, it is possible to select one from the plural number of control contents registered, arbitrarily in advance, thereby executing the processing corresponding to or depending on the control content selected.

Further, the present invention should not be restricted only to the embodiment mentioned above, but rather various variations or modification thereof are also practicable within a gist or concept thereof.

For example, though the control content to be executed by the on-vehicle equipment 20 was registered in advance into the service center 20 in the embodiment mentioned above, by using the stationary-type terminal $30_1$ and the portable-type terminal $30_2$ separate from the on-vehicle equipment 20, however it is also possible to register the control content to be executed by the on-vehicle equipment 20 in advance through accessing to the request receiving potion 101 of the service center 10 by using the on-vehicle equipment 20.

Also, the point search portion 1031, the POI search portion 1032 and the route search portion 1033 are provided within the providing portion 103 in the embodiment mentioned above, however those may be provided in an outside of the service center 10. And, it may be constructed, so that the providing portion 103 is connected to those through the Internet or the network for exclusive use thereof.

And also, instead of providing the function of publishing the information of the Web server, etc., as well as, the function of receiving various information from the user with using the CGI or the Java, within the request receiver portion 101 of the service center 10, in the embodiment mentioned above, it is also possible, with provision of a VoIP (Voice over IP) communication function and the speech recognition function, thereby to receive the ID information and the control content from the user of the access terminal through voices, while transmitting an automatic voice guidance to the access terminal (i.e., a VoIP terminal) accessing to the request receiver portion 101. And, it is also possible to identify or specify the ID information and the control content by treating the speech recognition upon the voices received, thereby adding them into the control information DB 105.

Alternatively, in the similar manner as in the service system explained in the conventional technology, it is also possible to receive the request from the user by an operator through an audio line, thereby adding the record thereof into the control information DB 105.

Also, the explanation was made only on the case of making the remote control upon the on-vehicle equipment, in the embodiment mentioned above, however the present invention should not be limited thereto. Thus, the present invention may be also applied into cases of making the remote control upon various information processing apparatuses other than the on-vehicle equipment 20. Herein, the function provided by the providing portion 103 is different, of course, depending upon the information processing apparatuses, on which the remote control should be made.

Also, the explanation was made only on the case of using the XML for describing the control information, in the embodiment mentioned above, however the present invention should not be restricted only thereto. According to the present invention, it is also possible to use the control information described in the binary data format, for example. Further, though the explanation was given only on the case where the HTML is used for description of the menu information, however the present invention should not be limited thereto. In the similar manner, it is also possible to use the menu information described in the binary data format, for example.

As was fully mentioned in the above, according to the present invention, it is possible to achieve the remote control of the on-vehicle equipment mentioned above, in accordance with the request received from the communication terminal other than the on-vehicle equipment, such as the navigation apparatus, etc.

What is claimed is:

1. A remote control apparatus for controlling on-vehicle equipment in accordance with a request made from a communication terminal, said apparatus comprising:

a request receiver portion for transmitting a control content selection menu including more than one control content of said on-vehicle equipment to said communication terminal, receiving from said communication terminal a control content selection from among said more than one control content included in said control content selection menu, together with an ID information, registering a record including said control content selection and said ID information into a control information database, generating a control information comprising a control command for executing said control content selection and a parameter, and registering them into a corresponding record;

a control information transmitter portion for receiving said ID information from said on-vehicle equipment, generating a control information selection menu to select said control content from a record which agrees with said ID information among said records which are registered in said control information database, and for transmitting it to said on-vehicle equipment; and a providing portion, operative when said record of said control content has registered, for executing a control information registered in said record when a control information corresponding to said control content is executed in the absence of a vehicle position information, for registering an execution result to said record corresponding to said control information database; wherein upon receipt of an execution request of said control content from said on-vehicle equipment, said providing portion causes a check of whether a registration of said execution result has been performed provides said registered control information result to said on-vehicle equipment when said execution result has registered, and provides said control result for executing said control information on said on-vehicle equipment in accordance with said execution request, when said execution result has not registered.

2. A remote control apparatus, as described in the claim 1, wherein, said providing portion provides at least one of a point search process, Point Of Interest process, and a route search process; and where said processing is provided without the information from said on-vehicle equipment executing said control content, regarding the processing necessary upon executing the control content in accordance with said control information, includes a case where at least any one of the point search process, the Point Of Interest process, and the route search process is executed without using a present location which is measured by said navigation apparatus.

3. A remote control apparatus, as described in the claim 1, wherein, said control information transmitter portion receives the ID information from said on-vehicle equipment and produces a menu information for causing an arbitrary control information to be selected among the control information, being registered in said control information database corresponding to the ID information received, thereby transmitting the menu information to said on-vehicle equipment, as well as, transmitting the control information indicated by select information received from said on-vehicle equipment to said on-vehicle equipment.

4. A remote control apparatus, as described in the claim 3, wherein said receiver portion produces the menu information in a form of HTML (HyperText Markup Language), being interpretable by an information reading function mounted on said on-vehicle equipment, and also produces the control information in a form of XML (extensible Markup Language), being non-interpretable by said information reading function, thereby transmitting those information to said on-vehicle equipment by using HTTP (HyperText Transfer Protocol).

5. A remote control apparatus, as described in the claim 3, further comprising:

a menu process portion for displaying a menu screen for selection of the control information in accordance with the menu information, being transmitted from said control information transmitter portion responding to transmission of the ID information to said control information transmitter portion of said remote control apparatus therefrom, and for transmitting the select information indicative of the control information which an operator selects through said menu screen, to said control information transmitter portion; and a control process portion for executing the control content in accordance with the control information, being transmitted from said control information transmitter portion responding to the select information, which said menu process portion transmits, wherein, said control process portion transmits the execution request of the processing, being necessary upon executing the control content in accordance with said control information, to said providing portion of said remote control apparatus, so as to obtain the execution result of said processing from said providing portion, thereby executing the control content in accordance with said control information with using said execution result.

6. A method for remotely controlling on-vehicle equipment in accordance with a request made from a communication terminal, said method comprising:

a request receiver portion transmitting a control content selection menu including more than one control content of said on-vehicle equipment to said communication terminal, receiving from said communication terminal a control content selection from said more than one control content included in said control content selection menu, together with an ID information, registering a record including said control content selection and said ID information into a control information database, generating a control information comprising a control command for executing said control content selection and a parameter, and registering them into a corresponding record;

a control information transmitter portion receiving said ID information from said on-vehicle equipment, generating a control information selection menu to select said control content from a record which agrees with said ID information among said records which are registered in said control information database, and transmitting it to said on-vehicle equipment; and when said record of said control content has registered, a providing portion executing a control information registered in said record when a control information corresponding to said control content is executed in the absence of a vehicle position information, for registering an execution result to said record corresponding to said control information database; wherein upon receipt of an execution request of said control content from said on-vehicle equipment, said providing portion causes a check of whether a registration of said execution result has been performed, provides said registered control information result to said on-vehicle equipment when said execution result has registered, and provides said control result for executing said control information on said on-vehicle equipment in accordance with said execution request, when said execution result has not registered.

* * * * *